United States Patent
Kato et al.

(10) Patent No.: US 12,506,246 B2
(45) Date of Patent: Dec. 23, 2025

(54) VEHICLE ANTENNA SYSTEM

(71) Applicants: AGC Inc., Tokyo (JP); SoftBank Corp., Tokyo (JP)

(72) Inventors: Yusuke Kato, Tokyo (JP); Hideaki Shoji, Tokyo (JP); Shoichi Takeuchi, Tokyo (JP); Toshiki Sayama, Tokyo (JP); Ryo Yamaguchi, Tokyo (JP); Kazuma Tomimoto, Tokyo (JP)

(73) Assignees: AGC INC., Tokyo (JP); SoftBank Corp., Tokyo (JP)

( * ) Notice: Subject to any disclaimer, the term of this patent is extended or adjusted under 35 U.S.C. 154(b) by 252 days.

(21) Appl. No.: 18/127,325

(22) Filed: Mar. 28, 2023

(65) Prior Publication Data

US 2023/0238681 A1    Jul. 27, 2023

Related U.S. Application Data

(63) Continuation of application No. PCT/JP2021/034997, filed on Sep. 24, 2021.

(30) Foreign Application Priority Data

Sep. 29, 2020  (JP) ................. 2020-163395

(51) Int. Cl.
*H01Q 1/12* (2006.01)
*H01Q 1/32* (2006.01)
*H01Q 9/40* (2006.01)

(52) U.S. Cl.
CPC .......... *H01Q 1/1271* (2013.01); *H01Q 1/325* (2013.01); *H01Q 9/40* (2013.01)

(58) Field of Classification Search
CPC ........ H01Q 1/1271; H01Q 1/32; H01Q 1/325; H01Q 9/40; H01Q 21/29
See application file for complete search history.

(56) References Cited

U.S. PATENT DOCUMENTS

| 5,473,281 A | 12/1995 | Honjo |
| 9,985,333 B2 | 5/2018 | Takeuchi et al. |
| 10,516,429 B2 | 12/2019 | Baek et al. |

(Continued)

FOREIGN PATENT DOCUMENTS

| CN | 107851890 A | 3/2018 |
| EP | 3 680 118 A1 | 7/2020 |

(Continued)

OTHER PUBLICATIONS

International Searching Authority, "International Search Report," issued in connection with International Patent Application No. PCT/JP2021/034997, dated Dec. 14, 2021.

(Continued)

*Primary Examiner* — Daniel Munoz
(74) *Attorney, Agent, or Firm* — Foley & Lardner LLP

(57) ABSTRACT

A vehicle antenna system having high transmission and reception efficiency is provided. A vehicle antenna system includes an antenna that is attached to a vehicle and is capable of transmitting and receiving radio waves of a predetermined frequency band. The antenna is attached to the vehicle in such a way that an elevation angle of the antenna with respect to a horizontal plane becomes large in a predetermined angle range in accordance with the height of a communication frequency band.

9 Claims, 7 Drawing Sheets

(56) References Cited

U.S. PATENT DOCUMENTS

| | | | |
|---|---|---|---|
| 2016/0344088 A1* | 11/2016 | Takeuchi | H01Q 1/1271 |
| 2018/0138586 A1 | 5/2018 | Takeuchi et al. | |
| 2019/0386384 A1* | 12/2019 | Villa | H01Q 21/28 |
| 2020/0335857 A1* | 10/2020 | Shoji | H01Q 21/0031 |
| 2021/0036412 A1 | 2/2021 | Kodama et al. | |

FOREIGN PATENT DOCUMENTS

| | | |
|---|---|---|
| JP | H07-094974 A | 4/1995 |
| JP | 2006-279743 A | 10/2006 |
| JP | 2019-043453 A | 3/2019 |
| WO | WO-2017/018323 A1 | 2/2017 |
| WO | WO-2019/208453 A1 | 10/2019 |

OTHER PUBLICATIONS

International Searching Authority, "Written Opinion," issued in connection with International Patent Application No. PCT/JP2021/034997, dated Dec. 14, 2021.

\* cited by examiner

| freq(MHz) | 0deg. | 10deg. | 20deg. | 30deg. | peak EL(deg.) |
|---|---|---|---|---|---|
| 900 | −3.90dBi | −3.44dBi | −3.75dBi | −4.87dBi | 10 |
| 2100 | −2.46dBi | −1.51dBi | −2.92dBi | −2.58dBi | 10 |
| 2500 | −3.14dBi | −3.91dBi | −1.86dBi | −3.11dBi | 20 |
| 3500 | −3.91dBi | −4.06dBi | −3.26dBi | −2.94dBi | 30 |

VEHICLE ANTENNA SYSTEM

INCORPORATION BY REFERENCE

This application is a continuation of PCT Application No. PCT/JP2021/034997, filed on Sep. 24, 2021, which is based upon and claims the benefit of priority from Japanese patent application No. 2020-163395, filed on Sep. 29, 2020, the disclosure of which is incorporated herein in its entirety by reference.

BACKGROUND

The present invention includes a vehicle antenna system.

In recent years, there has been a growing demand to expand high-speed and large-capacity communication infrastructure using radio waves having frequency bands of 4G Long Term Evolution (LTE) (700 MHz band) to 5G (sub6 (–6 GHz), sub-millimeter waves (20 GHz to 30 GHz), and millimeter waves (30 GHz to 300 GHz)). It is also expected that Vehicle to Everything (V2X), which is expected as vehicle-to-vehicle communication and road-to-vehicle communications using 5G, will be deployed in a wide range of applications.

The infrastructure for wireless communication system using a vehicle has been rapidly developed, and development of a vehicle on which a wireless communication system is mounted and an antenna that is mounted on the vehicle and is capable of transmitting and receiving radio waves having the above frequency band has been discussed. For example, U.S. Pat. No. 10,516,429 discloses a vehicle including RF modules including a plurality of antennas disposed in bumpers provided in front and back parts (outer edges) of the vehicle, a wireless communication system for transmitting and receiving radio waves in the entire horizontal plane thereof being mounted on the vehicle. International Patent Publication No. WO 2019/208453 discloses a vehicle antenna that transmits and receives radio waves having microwave and millimeter wave frequency bands.

SUMMARY

The range of the frequency band of radio waves to be transmitted and received in an antenna mounted on a vehicle has become wider than before. Therefore, it is required for the antenna mounted on the vehicle to efficiently transmit and receive radio waves over the entire range of the corresponding frequency band. In particular, as the part of the vehicle to which the antenna is attached may be limited depending on the structure of the vehicle, it has been required to attach an antenna in such a way that a high transmission power and a high reception sensitivity may be obtained.

In view of the aforementioned problem, an object of the present invention is to provide a vehicle antenna system having high transmission and reception efficiency.

A vehicle antenna system according to one aspect of the present invention includes: a first antenna that is attached to a vehicle and is capable of transmitting and receiving radio waves of a predetermined frequency band, in which the first antenna is attached to the vehicle in such a way that an elevation angle of the first antenna with respect to a horizontal plane becomes large in a predetermined angle range in accordance with the height of a communication frequency band.

In the aforementioned vehicle antenna system, the first antenna may be attached to a first part of the vehicle, the vehicle antenna system may further include a second antenna attached to a second part of the vehicle, the first antenna may be attached to the vehicle at a first elevation angle within the predetermined angle range with respect to the horizontal plane, a communication frequency band of the second antenna may be higher than a communication frequency band of the first antenna, and the second antenna may be attached to the vehicle at a second elevation angle within the predetermined angle range with respect to the horizontal plane, the second elevation angle being larger than the first elevation angle.

In the aforementioned vehicle antenna system, the communication frequency band of the first antenna and the communication frequency band of the second antenna may partially overlap each other, the first elevation angle may be determined based on a frequency of the first antenna at which a gain becomes a maximum, and the second elevation angle may be determined based on a frequency of the second antenna at which a gain becomes a maximum.

In the aforementioned vehicle antenna system, the first antenna and the second antenna may be antennas having the same shape.

In the aforementioned vehicle antenna system, an antenna conductor of at least one of the first antenna and the second antenna may have a three-dimensional shape.

In the aforementioned vehicle antenna system, at least one of the first antenna and the second antenna may be attached that a radiation surface is opposed to a glass inside the vehicle.

In the aforementioned vehicle antenna system, at least one of the first antenna and the second antenna may be attached that the radiation surface is substantially parallel to a plane of the glass.

In the aforementioned vehicle antenna system, the glass may include at least one of a windshield, a rear glass, and a side glass.

In the aforementioned vehicle antenna system, the difference between an angle of a radiation direction of the first antenna and an angle of a radiation direction of the second antenna seen from a vertical direction of the vehicle may be 150° to 180°.

In the aforementioned vehicle antenna system, the first part and the second part may be a combination of an inner surface side of a windshield and an inner surface side of a rear glass.

In the aforementioned vehicle antenna system, the predetermined angle range may be 0° to 45°.

In the aforementioned vehicle antenna system, the predetermined frequency band may be 700 MHz to 6 GHz.

According to one aspect of the present invention, it is possible to provide a vehicle antenna system having high transmission and reception efficiency.

DESCRIPTION OF EMBODIMENTS

With reference to the drawings, specific embodiments to which the present disclosure is applied will be described hereinafter in detail. However, the present disclosure is not limited to the following embodiments. Further, the following descriptions and the drawings will be omitted and simplified as appropriate for the clarity of explanation. Further, the same reference symbols are assigned to the same components throughout the drawings and repetitive descriptions thereof are omitted as needed. It should be noted that in each embodiment, some deviations in directions, such as a parallel direction, a horizontal direction, and a vertical direction, are permitted to the extent that they do not interfere with the effects of the present invention. The right-handed XYZ-coordinate system shown in FIG. 1 and the other drawings is used for the sake of convenience to illustrate a positional relation among components. In general, as is common among the drawings, a Z-axis positive direction is a vertically upward direction and an XY-plane is a horizontal plane.

First Embodiment

<Configuration Example of Vehicle Antenna System>

Figure 1:
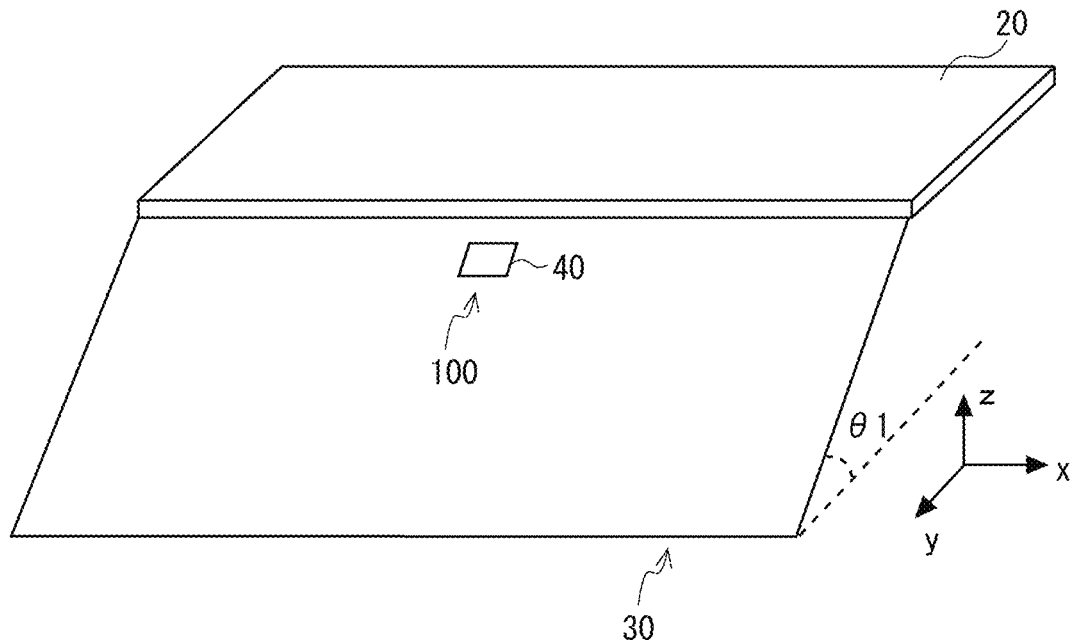
FIG. 1 is a perspective view illustrating a vehicle to which a vehicle antenna system according to a first embodiment is attached.

With reference to FIG. 1, a configuration example of a vehicle antenna system 100 according to a first embodiment will be described. FIG. 1 is a perspective view illustrating a vehicle to which the vehicle antenna system according to the first embodiment is attached.

The vehicle antenna system 100 is an antenna system attached to a vehicle 20. The vehicle antenna system 100 includes an antenna 40. The antenna 40 is attached to a part of the vehicle 20. The antenna 40 is attached to, for example, a part of the vehicle 20 in the vicinity of a glass plate 30 attached to the vehicle 20 in such a way that a radiation surface of the antenna 40 is facing to the glass plate 30. The antenna 40 is not limited to be provided in the vicinity of the glass and the antenna 40 may instead be provided in the vicinity of a resin as long as the part of the vehicle 20 where the antenna 40 is attached is a dielectric. The resin part used in the vehicle 20 may be an aero part such as a resin door or a rear spoiler that is not shown. The glass plate 30 is, for example, a windshield of the vehicle 20. The glass plate 30 is attached to a window frame (not shown) of the vehicle 20 at a predetermined arrangement angle θ1 with respect to a horizontal plane. The glass plate 30 may instead be a rear glass or a side glass. In the following description, the "glass plate 30" may be simply referred to as a "glass 30".

The antenna 40 is, for example, an antenna module and is capable of transmitting and receiving radio waves of a predetermined frequency band. Alternatively, the antenna 40 may be a glass printed antenna in which a planar conductor pattern is provided on a main surface of the glass plate 30. The predetermined frequency band is a frequency band supported by the antenna 40. The predetermined frequency band may be a frequency band from the 4G LTE frequency band to the 5G frequency band or may be a frequency band from 700 MHz to 6 GHz.

<Configuration Example of Antenna>

Figure 2:
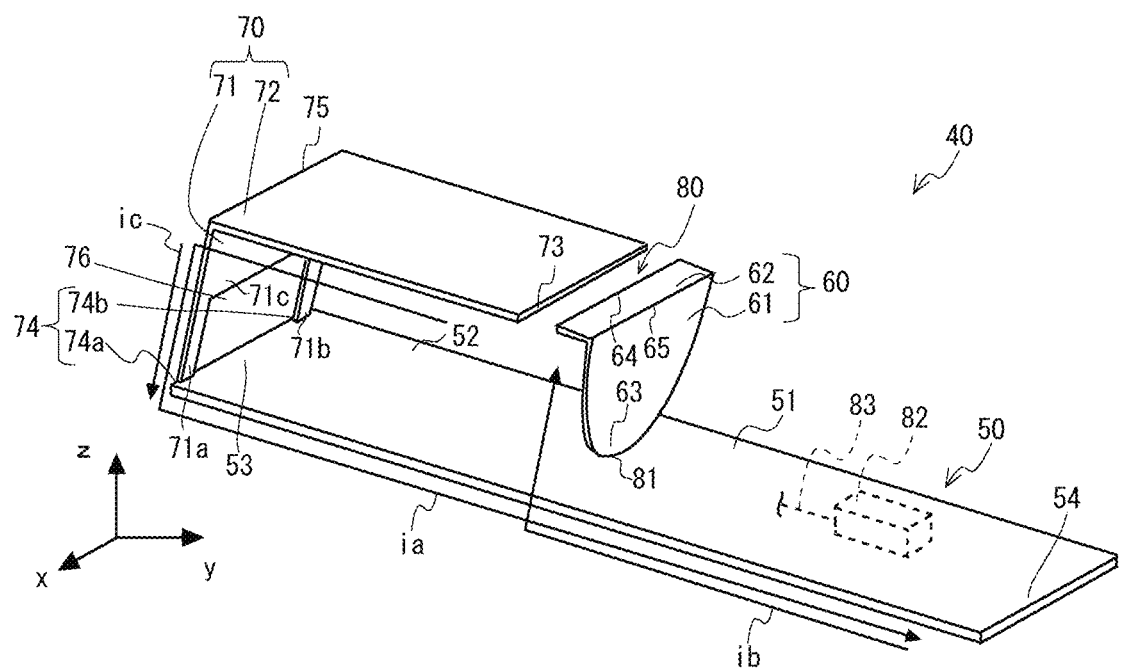
FIG. 2 is an enlarged view of an antenna according to the first embodiment.

Referring next to FIG. 2, a configuration example of the antenna 40 used for the vehicle antenna system 100 according to the first embodiment will be described. FIG. 2 is an enlarged view of the antenna used for the vehicle antenna system according to the first embodiment. As shown in FIG. 2, the antenna 40 is an antenna in which an antenna conductor forms a three-dimensional shape. The antenna 40 includes a conductor plate 50, a conductor plate 60, and a conductor plate 70.

The conductor plate 50 includes a feeding part 81 having the conductor plate 50 as a ground reference. The feeding part 81 indicates a feeding point of the antenna 40. The feeding part 81 is provided between an end part 53 and an end part 54 of the conductor plate 50 in the longitudinal direction of the conductor plate 50. The conductor plate 50 includes a first plate surface part 52 that is extended from the feeding part 81 toward the end part 53 and a second plate surface part 51 that is extended from the feeding part 81 toward the end part 54.

The conductor plate 60 includes an end part 63 connected to the feeding part 81 and an end part 64 that is provided on a side opposite to the side where the end part 63 is provided and is positioned in a direction away from the conductor plate 50. The conductor plate 60 has a plate surface 61 whose width increases from the end part 63 toward the end part 64. The plate surface 61 is preferably provided so as to be inclined within a range of ±90 degrees with respect to the direction parallel to the conductor plate 50. In particular, the direction parallel to the conductor plate 50 is more preferably within a range of ±45 degrees, still more preferably within a range of ±20 degrees, yet more preferably within a range of ±5 degrees with respect to the short direction of the conductor plate 50, and most preferably, the direction parallel to the conductor plate 50 matches the short direction. Further, it is sufficient that the conductor plate 60 have a part that is widened from the end part 63 to the end part 64. Therefore, the conductor plate 60 may have, for example, a part whose width stays the same, or a part whose width decreases from the end part 63 toward the end part 64. Note that the conductor plate 60 preferably does not have such a part whose width decreases from the end part 63 toward the end part 64. Further, the conductor plate 60 may be a flat shape without any bend but may be a three-dimensional shape including a bent part, as shown in FIG. 2.

The conductor plate 60 includes the plate surface 61 having the end part 63 and a plate surface 62 having the end part 64. The plate surface 62 is a part that is bent at a bent part 65 with respect to the plate surface 61. Since the bent plate surface 61 is provided, the distance (height) in the Z-axis direction from the conductor plate 50 can be reduced as compared with a configuration in which the bent surface 61 is not bent.

The conductor plate 70 includes an end part 73 capacitively coupling with the end part 64 of the conductor plate 60 and an end part 74 connected to the conductor plate 50 on the same side as the end part 53 with respect to the feeding part 81. The end part 73 capacitively couples with the end part 64 via a gap 80 having an interval allowing capacitive coupling. The direction of the gap 80 forming the capacitive coupling is not limited to the direction parallel to the end part 73 and may be a desired direction. Further, the capacitive coupling between the end part 64 and the end part 73 may be achieved by other forms such as a comb structure or dielectric loading.

The conductor plate 70 includes an opposing part 71 that is opposed to the plate surface 61 of the conductor plate 60 in the longitudinal direction of the conductor plate 50 and an opposing part 72 that is opposed to the first plate surface part 52 of the conductor plate 50 in the direction parallel to the first plate surface part 52 of the conductor plate 50. The opposing part 72 is a part that is bent in a bent part 75 with respect to the opposing part 71. The opposing part 72 includes the end part 73 and the opposing part 71 includes the end part 74.

In the antenna 40, the conductor plate 60 is connected, at the end part 63, to the feeding part 81 which has the conductor plate 50 as the ground reference, and is formed so that the width of the plate surface 61 increases with a distance from the conductor plate 50. When a length of an outer edge part (e.g., a curved line part expanding from the end part 63) of the plate surface 61 is set in such a manner that the conductor plate 60 has an electrical length for operating in a desired frequency range, the conductor plate 60 can function as a radiating element of a Ultra Wide Band (UWB) antenna capable of receiving radio waves over a wide frequency band.

On the other hand, the conductor plate 60 is connected, at the end part 63, to the feeding part 81 which has the conductor plate 50 as the ground reference, and the end part 64 of the conductor plate 60 capacitively couples with the end part 73 of the conductor plate 70. Accordingly, the conductor plate 60 also functions as a feeding element that feeds power to the conductor plate 70 through capacitive coupling. Then the conductor plate 70 is connected, at the end part 74, to the conductor plate 50. Accordingly, since the conductor plate 60 capacitively couples with the conductor plate 70, the conductor plates 50 and 70 obtained by combining the conductor plate 70 with the conductor plate 50 resonate as a single radiating element that is fed by the conductor plate 60 by capacitive coupling. Accordingly, the conductor lengths of the conductor plate 70 and the conductor plate 50 are set in such a manner that the conductor plates 50 and 70 have an electrical length for operating in a desired frequency range, so that the conductor plates 50 and 70 can function as radiating elements operating at a resonance frequency different from the conductor plate 60.

In this manner, the antenna 40 includes a first antenna which not only operates in a first operation mode in which the conductor plate 60 operates as a radiating element but also operates in a second operation mode in which the conductor plate 60 operates as a feeding element and the conductor plates 50 and 70 operate as radiating elements. That is, since the conductor plates 50 and 70 can resonate at a resonance frequency different from the resonance frequency of the conductor plate 60, the range of the frequency that can be transmitted or received by the antenna 40 can be readily broadened. In the first operation mode, the antenna 40 resonates with a current ib flowing through the conductor plate 60 and a current is flowing through the conductor plate 70, and in the second operation mode, the antenna 40 resonates with a current is flowing through the conductor plates 50 and 70.

For example, the conductor plate 60 has a first electrical length Le1 resonating at a first operation frequency f1 and the conductor plates 50 and 70 have a second electrical length Le2 resonating at a second operation frequency f2 lower than the first operation frequency f1. As a result, the conductor plates 50 and 70 can resonate at a resonance frequency lower than the lowest-order resonance frequency of the conductor plate 60.

For example, when the first electrical length Le1 is set to a quarter wavelength of the first operation frequency f1, the conductor plate 60 can resonate at the first operation frequency f1 while the size of the conductor plate 60 is reduced. Further, for example, when the second electrical length Le2 is set to a quarter wavelength of the second operation frequency f2, the conductor plates 50 and 70 can resonate at the second operation frequency f2 while the size of conductor plates 50 and 70 is reduced.

The first electrical length Le1 corresponds to a length obtained based on the shortest conductor length along the conductor plate 60 from the end part 63 to the end part 64 in view of a dielectric constant, a thickness, or the like of a substrate in contact with or in proximity to the conductor plate 60. The second electrical length Le2 corresponds to a length obtained based on the shortest conductor length along the conductor plates 50 and 70 from the end part 73 to the end part 54 via the end part 74 in view of a dielectric constant, a thickness, or the like of a substrate in contact with or in proximity to the conductor plates 50 and 70.

Further, the opposing part 71 of the conductor plate 70 and the plate surface 61 of the conductor plate 60 are preferably separated away from each other by an electrical length of the quarter wavelength of the first operation frequency f1. In this case, the antenna 40 has a configuration in which the plate surface 61 through which the current ib flows and the opposing part 71 through which the current ic, whose phase is inverted from the current ib, flows are apart by a quarter wavelength, and the opposing part 71 is grounded to the conductor plate 50. In this case, like array antennas and Yagi antennas, the directivity of the antenna 40 can be oriented toward the end part 54 in the longitudinal direction of the conductor plate 50. The opposing part 71 of the conductor plate 70 is preferably parallel to the plate surface 61 of the conductor plate 60 so that the directivity of the antenna 40 can be oriented toward the end part 54 in the longitudinal direction of the conductor plate 50.

The conductor plate 70 further includes the opposing part 72 that faces the first plate surface part 52 of the conductor plate 50. Since the opposing part 72 is provided in the conductor plate 70, it becomes easy to adjust the directivity of the antenna 40. The opposing part 72 is preferably parallel to the first plate surface part 52 of the conductor plate 50 so that it becomes easier to adjust the directivity. Further, when the conductor plate 70 is bent, the height of the antenna 40 can be reduced compared to a form in which the conductor plate 70 is not bent.

The shape of the plate surface 61 of the conductor plate 60 is preferably axisymmetric about a virtual line passing through the feeding part 81 in the direction vertical to that of the plane of the conductor plate 50, so that the directivity of the antenna 40 can be made approximately symmetrical about the direction vertical to that of the plane of the conductor plate 50. Further, the conductor plate 60 has, for example, a semi-circular plate surface 61. However, the shape of the plate surface 61 is not limited to a semicircular shape, and may be other shapes such as an inverted triangular or semielliptical shape. Further, a slot may be formed in the conductor plate 60.

The conductor plate 60 may be bent in such a way that the end part 64 is in proximity to the end part 63, whereby it is possible to reduce the height of the antenna 40. The length of the conductor from the end part 63 to the end part 64 is preferably 100 mm or smaller so that the height of the antenna 40 may be reduced. More preferably, the length of the conductor from the end part 63 to the end part 64 is 70 mm or smaller.

The end part 63 positioned at the bottom part of the plate surface 61 is connected to the feeding part 81. The end part 63 may be connected to the feeding part 81 by directly being in contact with the feeding part 81, or may be connected to the feeding part 81 by capacitive coupling or the like.

The feeding part 81 is preferably located at a central part of the conductor plate 50 in a direction parallel to the plate surface 61, so that the directivity of the antenna 40 can be made approximately symmetrical about a direction normal to the plate surface 61. The central part referred to herein means a range of ±10% from the center in the width of the conductor plate 50 with respect to the width of the conductor plate 50. Preferably, the central part is in a range of ±5% of the width, and more preferably, in the center of the width.

One end of a coaxial cable is connected to the feeding part 81 directly by solder or the like or indirectly by a connector or the like. The other end of the coaxial cable is connected to a device having at least one of, for example, a transmission function and a reception function.

In FIG. 2, the opposing part 71 of the conductor plate 70 may include an opening part 76. When the opening part 76 is provided, the material of the opposing part 71 can be reduced and the weight of the antenna 40 can be reduced. Since the opposing part 71 is provided with the opening part 76, the opposing part 71 includes wall parts 71a, 71b, and 71c surrounding the opening part 76. The wall parts 71a and 71b are positioned at the respective sides of the opening part 76, the wall part 71a is connected to the end part 53 of the conductor plate 50 at an end part 74a, and the wall part 71b is connected to the end part 53 of the conductor plate 50 at an end part 74b. Further, the wall part 71c is connected to the bent part 75 and to the wall parts 71a and 71b.

Further, in FIG. 2, the antenna 40 may be configured to have a second antenna 82 provided on the second plate surface part 51 of the conductor plate 50. When a feeding line 83 connected to a feeding part of the second antenna 82 passes through the opening part 76, the impedance characteristics and the radiation characteristics of the antenna 40 are less affected by high-frequency currents flowing in proximity to the feeding line 83. A duplexer connected to the feeding part 81 of the conductor plate 60 and the feeding part of the second antenna 82 may be provided.

<Attachment Example of Antenna>

Next, characteristics of the antenna 40 will be described prior to giving the description of examples in which the antenna 40 is attached to the vehicle 20. First, as a premise, International Patent Publication No. WO 2019/208453 discloses that the antenna is preferably installed in such a way that the radiation surface of this antenna is in a range of 90°±15° with respect to the horizontal plane. As described above, however, frequency bands of radio waves to be transmitted and received in antennas mounted on vehicles have become wider than before. In other words, one antenna or a plurality of antennas, that is, an antenna (set) capable of coping with a wide frequency band has tended to be attached to a vehicle. Therefore, it is required to arrange an antenna in the vehicle in accordance with the communication frequency band used for communication among the frequency bands supported by the antenna. In order to attain this object, the present inventors have measured characteristics of antennas attached to vehicles to know the characteristics of the antennas and studied examples in which the antennas are attached to vehicles in accordance with the characteristics of the antennas.

Note that the communication frequency band is a frequency band that is used in communication between the antenna 40 and a wireless communication apparatus such as a wireless base station that performs communication by transmitting and receiving radio waves. When the wireless communication apparatus with which the antenna 40 communicates is, for example, an LTE wireless base station, the communication frequency band is 700 MHz band to 3500 MHz band. Further, when the antenna 40 is, for example, an LTE wireless base station and communicates with a wireless base station in the 700 MHz band, the communication frequency band is the 700 MHz band. Further, when the wireless communication apparatus with which the antenna 40 communicates is, for example, a 5G (sub6) wireless base station, the communication frequency band is 3600 MHz band to 4600 MHz band. In this manner, the communication frequency band is a frequency band in the frequency bands supported by the antenna 40 that the antenna 40 uses for the communication with the wireless communication apparatus opposed to the antenna 40.

The present inventors have attached the antenna 40 or an antenna 90 that will be described later to, for example, parts where the antenna may be attached in FIG. 6 to measure Reference Signal Received Power (RSRP) by traveling tests. The present inventors have also measured the directivity of this antenna and calculated an average gain in the azimuth angle direction (hereinafter the "average gain in the azimuth angle direction" will be simply referred to as an "average gain") in each elevation angle (0°, 10°, 20°and 30°). As a result, it has been found that as the frequency becomes higher, the correlation between the average gain of the elevation angle and the RSRP measurement result becomes stronger. It is expected from this result that, the higher the frequency is, the higher the transmitting/receiving performance of an antenna with the maximum value of the gain at a high elevation angle. It is also expected that the shape of the antenna is not limited to the shape of the antenna 40 or the shape of the antenna 90 and that the similar performance may be obtained as long as the antenna is capable of transmitting and receiving a predetermined frequency band.

Figures 3, 4:
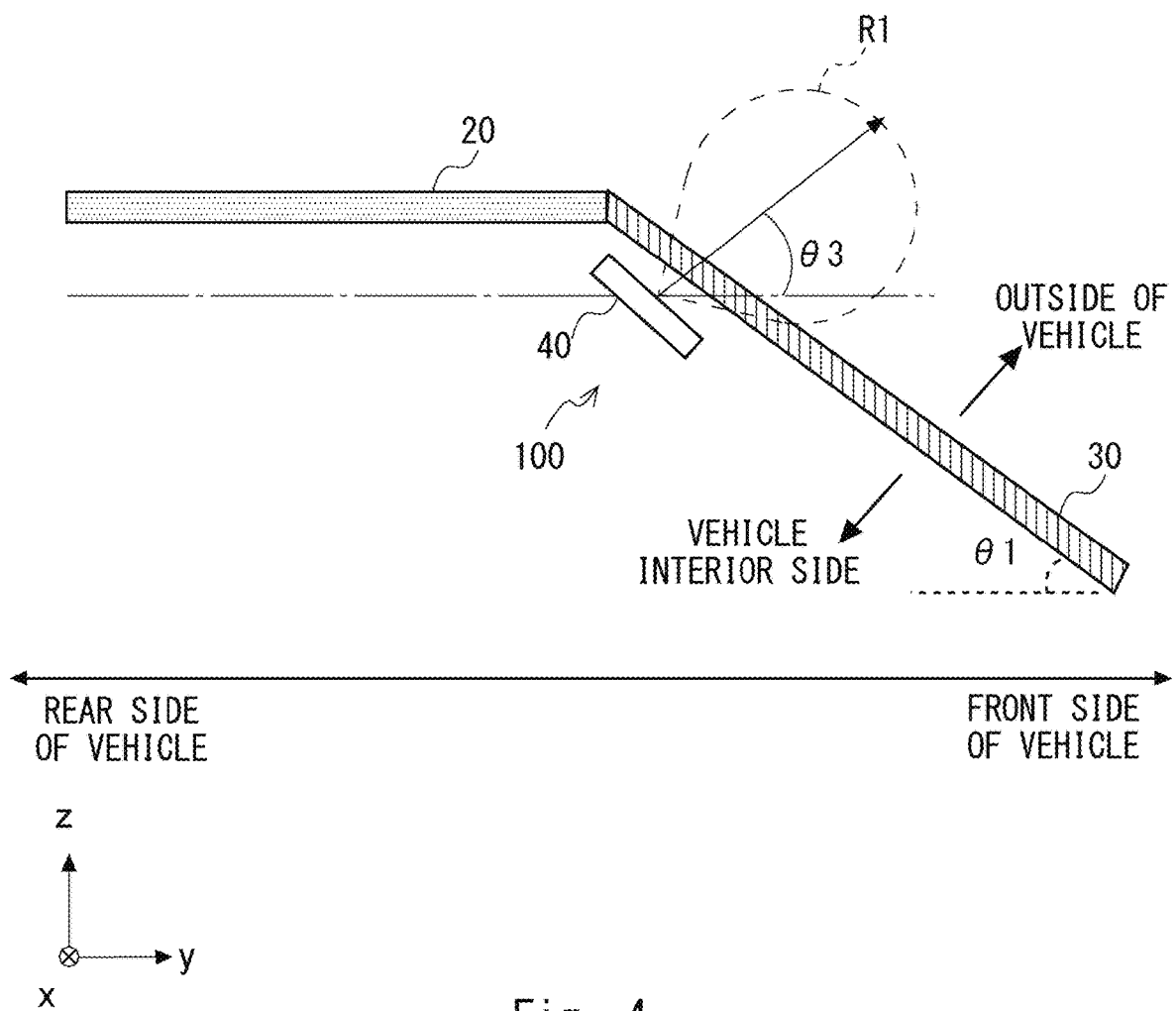
FIG. 3 is a diagram showing measurement results regarding characteristics of the antenna.
FIG. 4 is a diagram for describing an example in which the antenna according to the first embodiment is attached to the vehicle.
Figure 6:
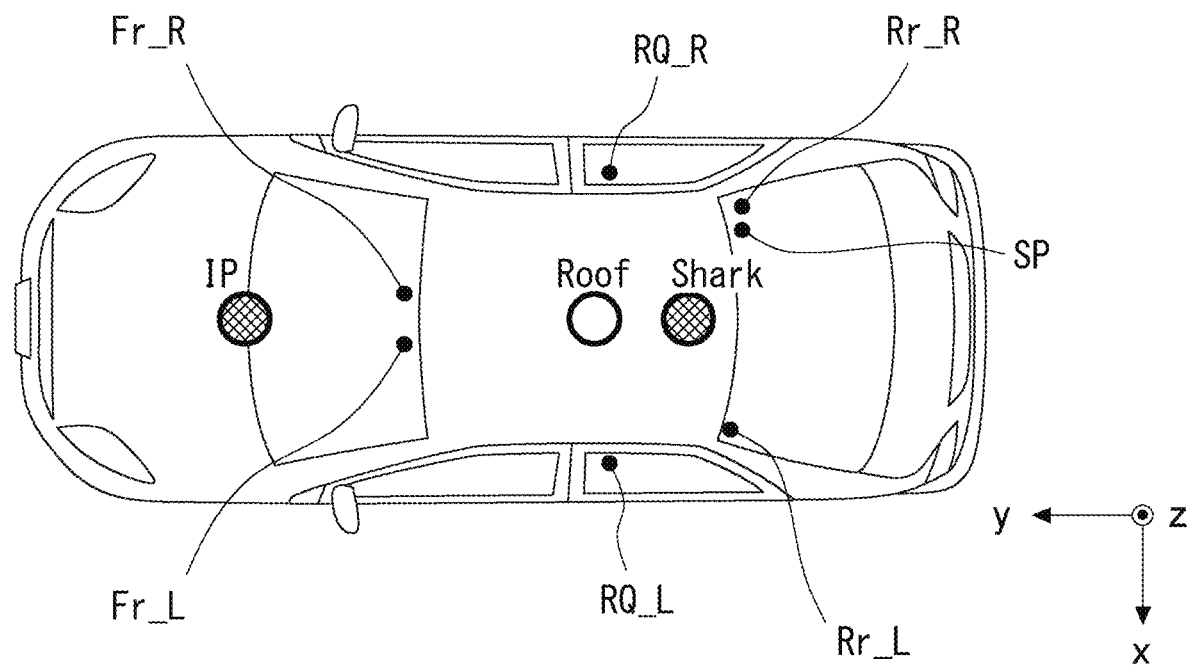
FIG. 6 is a diagram showing one example of a part of the vehicle where the antenna is attached.

FIG. 3 shows the average gain at each elevation angle and each frequency in a case in which the antenna 40 is attached to a place Rr_R in FIG. 6. It is seen from FIG. 3 that the antenna 40 is the aforementioned antenna having a maximum value of the gain at a high elevation angle as the frequency increases. Accordingly, the present inventors have come to the conclusion that the optimal transmitting/receiving performance may be obtained by attaching the antenna 40 to the place Rr_R. In this specification, "the elevation angle of the antenna 40" means an angle between the horizontal plane and the radiation surface of the antenna 40. When, for example, the radiation surface of the antenna 40 is parallel to the horizontal plane, the elevation angle of the antenna 40 is 0°, and when the direction of the radiation surface of the antenna 40 is a zenith direction, the elevation angle of the antenna 40 is 90°. The "elevation angle of the antenna 40" indicates "the elevation angle of the antenna 40 with respect to the horizontal plane" or "the elevation angle of the radiation surface of the antenna 40 with respect to the horizontal plane", and the same is applicable to the following description. Further, in the following description, "the elevation angle of the antenna 40 with respect to the horizontal plane" or "the elevation angle of the radiation surface of the antenna 40 with respect to the horizontal plane" may also be referred to as "the elevation angle of the antenna 40". The measurement has been conducted by changing the attachment angle for four points where the elevation angles of the radiation surface of the antenna 40 are 0°, 10°, 20°, and 30°. Note that the antenna 40 is configured to be able to transmit and receive radio waves of a wide frequency band of at least 900 MHz to 3500 MHz.

In FIG. 3, the first column from the left is a column indicating the frequencies at which the antenna 40 makes communication. In FIG. 3, the first row from the top and the second column to the fifth column from the left indicate the elevation angles of the antenna 40. In FIG. 3, the second row to the fifth row from the top and the second column to the fifth column from the left indicate the antenna gain of the antenna 40. In FIG. 3, the first column from the right is a column indicating the elevation angles (peak Elevation (EL)) of the four elevation angles 0°, 10°, 20°, 30° where the antenna gain of the antenna 40 was the highest for each communication frequency of the antenna 40.

Referring next to FIG. 4, a configuration example of the vehicle antenna system 100, which is an example in which the antenna 40 is attached to the vehicle 20, will be described. FIG. 4 is an explanatory diagram of an example in which the antenna in the vehicle antenna system according to the first embodiment is attached to the vehicle, and is a partially enlarged view of the vehicle in a side view.

As shown in FIG. 4, the antenna 40 is attached on the vehicle interior side of the glass plate 30 of the vehicle 20. The antenna 40 is attached to, for example, an upper central part of the glass plate 30. The antenna 40 may instead be attached to a lower central part of the glass plate 30, or may be attached in a desired place such as a place near one of the right and left ends of the glass plate 30.

The antenna 40 is attached so as to be facing to the interior side surface of the glass plate 30 of the vehicle 20. The antenna 40 may be attached in such a way that the radiation surface of the antenna 40 becomes substantially parallel to the plane of the glass plate 30. The expression "substantially parallel to" means not only a state in which the radiation surface of the antenna 40 is parallel to the glass plate 30 but also a state in which the angle between the radiation surface of the antenna 40 and the glass plate 30 is, for example, 5° or smaller. The antenna 40 is attached in such a way that the elevation angle thereof with respect to the horizontal plane is adjustable, and the elevation angle of the antenna 40 with respect to the horizontal plane becomes large in a predetermined angle range in accordance with the height of the communication frequency band in a predetermined frequency band that indicates a frequency band where communication is performed. In other words, the antenna 40 is attached in such a way that the elevation angle of the radiation surface of the antenna 40 with respect to the horizontal plane becomes large in accordance with the height of the communication frequency band in a predetermined angle range. The predetermined frequency band may be, for example, a frequency band from the 4G LTE frequency band to the 5G frequency band, or may be a frequency band from 700 MHz to a band smaller than 6 GHz (a so-called "5G-sub6"). Further, the predetermined angle range may be 0° to 45°, 0° to 35°, or 0° to 30°.

In FIG. 4, the arrow pointing from the antenna 40 to the outside of the vehicle indicates the direction in which radio waves are transmitted from the antenna 40 (the radiation direction from the radiation surface). The direction opposite to that of this arrow is a direction in which radio waves are received by the antenna 40. A region R1 shown by the dotted line in FIG. 4 is a region schematically expressing the radiation state (main lobe) of radio waves of the antenna 40. The arrow shown in FIG. 4 corresponds to the center direction of this main lobe. An alternate long and short dash line indicates the plane parallel to the horizontal plane. An angle θ3 between the alternate long and short dash line and the arrow pointing from the antenna 40 to the outside of the vehicle corresponds to the elevation angle of the antenna 40. When the communication frequency band is, for example, a relatively low frequency band such as 900 MHz, the antenna 40 is attached in such a way that the elevation angle of the antenna 40 (angle θ3) becomes small. On the other hand, when the communication frequency band is a relatively high frequency band such as several GHz used for 5G, the antenna 40 is attached in such a way that the elevation angle of the antenna 40 (angle θ3) becomes large within the predetermined angle range.

Figure 5:
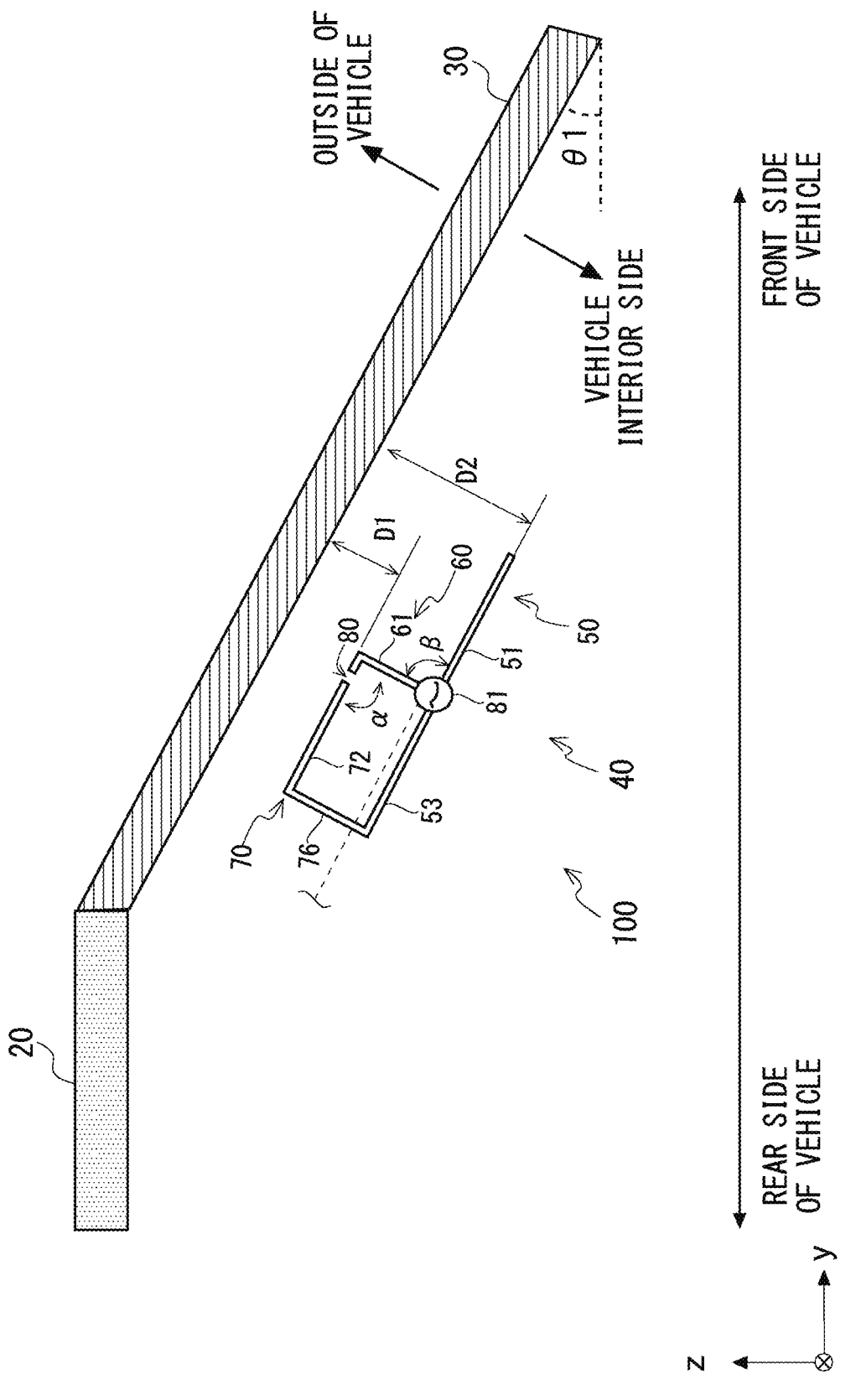
FIG. 5 is a diagram for describing an example in which the antenna according to the first embodiment is attached to the vehicle.

Referring next to FIG. 5, details of an example in which the antenna 40 is attached to the vehicle 20 will be described. FIG. 5 is an explanatory diagram of an example in which the antenna in the vehicle antenna system according to the first embodiment is attached to a vehicle.

The antenna 40 is attached to the glass plate 30 by an attachment member (not shown) such as an antenna bracket. The antenna 40 is attached in such a way that at least one of the conductor plate 60 and the conductor plate 70 is in proximity to the glass plate 30 at a distance D1. The antenna 40 is attached in such a way that the conductor plate 50 is in proximity to the glass plate 30 at a distance D2. In this manner, since at least one of the conductor plate 60 and the conductor plate 70 is brought into proximity with the glass plate 30 at the distance D1, the shortening effect due to the glass plate 30, which is a dielectric, may be obtained, and the size of the antenna 40 can be reduced. In addition, since the conductor plate 50 is brought into proximity with the glass plate 30 at the distance D2, the shortening effect due to the glass plate 30, which is a dielectric, may be obtained, and the size of the antenna 40 can be reduced. Since the distance D1 and the distance D2 are different from each other in the antenna 40, an antenna can be formed in a three-dimensional shape having an element with a component whose direction is vertical to that of the plane of the glass plate 30.

While the opposing part 72 of the conductor plate 70 is shown so as to be attached parallel to the glass plate 30 in FIG. 5, the antenna 40 may be configured in such a way that the distance between the opposing part 72 of the conductor plate 70 and the glass plate 30 can be adjusted. When the distance between the opposing part 72 of the conductor plate 70 and the glass plate 30 can be adjusted, the elevation angle of the antenna 40 (the direction of the radiation surface of the antenna 40) can also be adjusted. When the antenna 40 is attached in such a way that, for example, the distance between the opposing part 72 and the glass plate 30 becomes small, the second plate surface part 51 is away from the glass plate 30, and the antenna 40 is rotated with respect to the feeding part 81, the elevation angle of the antenna 40 may be made smaller than that in a state in which the antenna 40 is substantially parallel to the glass plate 30. Alternatively, the antenna 40 may be attached in such a way that the distance between the opposing part 72 and the glass plate 30 becomes large, the second plate surface part 51 becomes close to the glass plate 30, and the antenna 40 is rotated with respect to the feeding part 81, whereby it is possible to make the elevation angle of the antenna 40 larger than that in a state in which the antenna 40 is substantially parallel to the glass plate 30. In this manner, the antenna 40 may be attached so as to be rotated with respect to the feeding part 81. Further, the antenna 40 is adjusted in such a way that the elevation angle thereof is that in accordance with the communication frequency band, whereby the optimal antenna gain may be obtained.

The directivity of a planar (i.e., two-dimensional) antenna without a component whose direction is vertical to that of the plane of the glass plate 30 tends to be strong in the direction normal to the glass plate 30. Conversely, the antenna 40 has an element having a component whose direction is vertical to that of the plane of the glass plate 30, and therefore, the direction in which the directivity of the antenna 40 becomes stronger is likely to be inclined in a direction closer to the horizontal plane rather than the direction normal to the glass plate 30. Therefore, with the antenna 40 in the vehicle antenna system according to the first embodiment, the directivity in the direction parallel to the horizontal plane (horizontal direction) is improved, so that the antenna gain (operation gain) in the horizontal direction can be further increased.

Further, the antenna 40 has a bent-shaped element. When the comparison is made at the same antenna length, the height of the antenna 40 with the element having many bent parts can be readily reduced relative to a non-bent antenna. When the element is bent at two or more parts, the height (D2−D1) of the antenna 40 can be readily reduced while a predetermined antenna length is maintained. Therefore, this can reduce a large protrusion protruding from the vehicle interior side surface of the glass plate 30, and the antenna 40 is less likely to be an obstacle for the occupants.

In the antenna 40, the opposing part 72 of the conductor plate 70 and the second plate surface part 51 of the conductor plate 50 are coupled to each other by a relatively strong capacitive coupling by the conductor plate 60 formed with the plate surface 61 in the direction vertical to the plane of the glass plate 30. With such coupling, the opposing part 72 and the second plate surface part 51 are not opposed to each other, or conductive parts opposed to each other are relatively small (i.e., narrow), and accordingly, the capacitive coupling between the opposing part 72 and the second plate surface part 51 is less likely to become strong. Therefore, with the antenna 40 in the vehicle antenna system according to the first embodiment, good impedance matching may be obtained.

Further, as shown in FIG. 5, from the viewpoint of improving the horizontal directivity, it is preferable that the distance D1 be shorter than the distance D2. Note that the distance D1 may be zero. When the distance D1 is zero, at least one of the conductor plate 60 and the conductor plate 70 is in contact with the vehicle interior side surface of the glass plate 30.

The antenna 40 is attached to an upper part of the vehicle interior side with respect to the glass plate 30. An angle α indicates an angle between the opposing part 72 and the plate surface 61 and an angle β indicates an angle between the plate surface 61 and the conductor plate 50. The angle α is an angle larger than 0° and is smaller than 180° (e.g., 90°) and the angle β is also an angle larger than 0° and is smaller than 180° (e.g., 90°). While the angle α and the angle β are preferably a right angle, they may be an angle other than the right angle (e.g., 45°). The angles α and β may either be the same or different from each other.

The antenna 40 is suitable for transmission and reception of radio waves in the Ultra High Frequency (UHF) and Super High Frequency (SHF) bands. For example, the antenna 40 is suitable for transmission and reception of radio waves in three bands (0.698 GHz to 0.96 GHz, 971 GHz to 2.97 GHz, 2.4 GHz to 2.69 GHz) among a plurality of frequency bands used for Long Term Evolution (LTE). The antenna 40 is also suitable for transmission and reception of radio waves in the frequency band of 5G (sub6). The antenna 40 is also suitable for transmission and reception of radio waves in the Industry Science Medical (ISM) band. The ISM bands include 0.863 GHz to 0.870 GHz (Europe), 0.902 GHz to 0.928 GHz (United States), and 2.4 GHz to 2.5 GHz (worldwide). The communication standards using the 2.4 GHz band, which is one of the ISM bands, include a wireless Local Area Network (LAN) of the Direct Sequence Spread Spectrum (DSSS) method based on IEEE802.91b, Bluetooth (registered trademark), and some of the Fixed Wireless Access (FWA) systems.

As described above, the antenna 40 included in the vehicle antenna system 100 is attached in such a way that the elevation angle of the radiation surface with respect to the horizontal plane becomes large in a predetermined angle range in accordance with the height of the communication frequency band. In this way, the antenna 40 is attached in such a way that the elevation angle thereof is that in accordance with the communication frequency band, whereby the optimal antenna gain may be obtained. Accordingly, with the vehicle antenna system 100 according to the first embodiment, it is possible to provide the vehicle antenna system having high transmission and reception efficiency in accordance with the frequency band of the communication target.

Modified Example 1

While the antenna 40 has been described to be attached in proximity to the glass plate 30, which is a windshield, in the vehicle antenna system according to the first embodiment, a part of a vehicle where the antenna 40 may be a part other than the windshield. With reference to FIG. 6, an example of the part where the antenna 40 is attached will be described.

The antenna 40 may be provided, other than in an upper part of the windshield Fr_R and Fr_L, in proximity to a side glass RQ_R, a side glass RQ_L, an upper right side of the rear glass Rr_R, or an upper left side of the rear glass Rr_L. Further, the antenna 40 may be attached to an instrument panel IP of the vehicle 20, a spoiler SP, the roof Roof of the vehicle 20, or a shark fin Shark provided on the roof of the vehicle 20. Further, the antenna 40 may be attached to a bumper on the front side of the vehicle 20 or a bumper on the rear side of the vehicle 20, although it is not shown in FIG. 6.

Modified Example 2

While the antenna included in the vehicle antenna system 100 has been described to be an antenna module in the aforementioned first embodiment, the antenna included in the vehicle antenna system 100 may be replaced by a printed antenna having a planar shape (two-dimensional shape).

Figure 7:
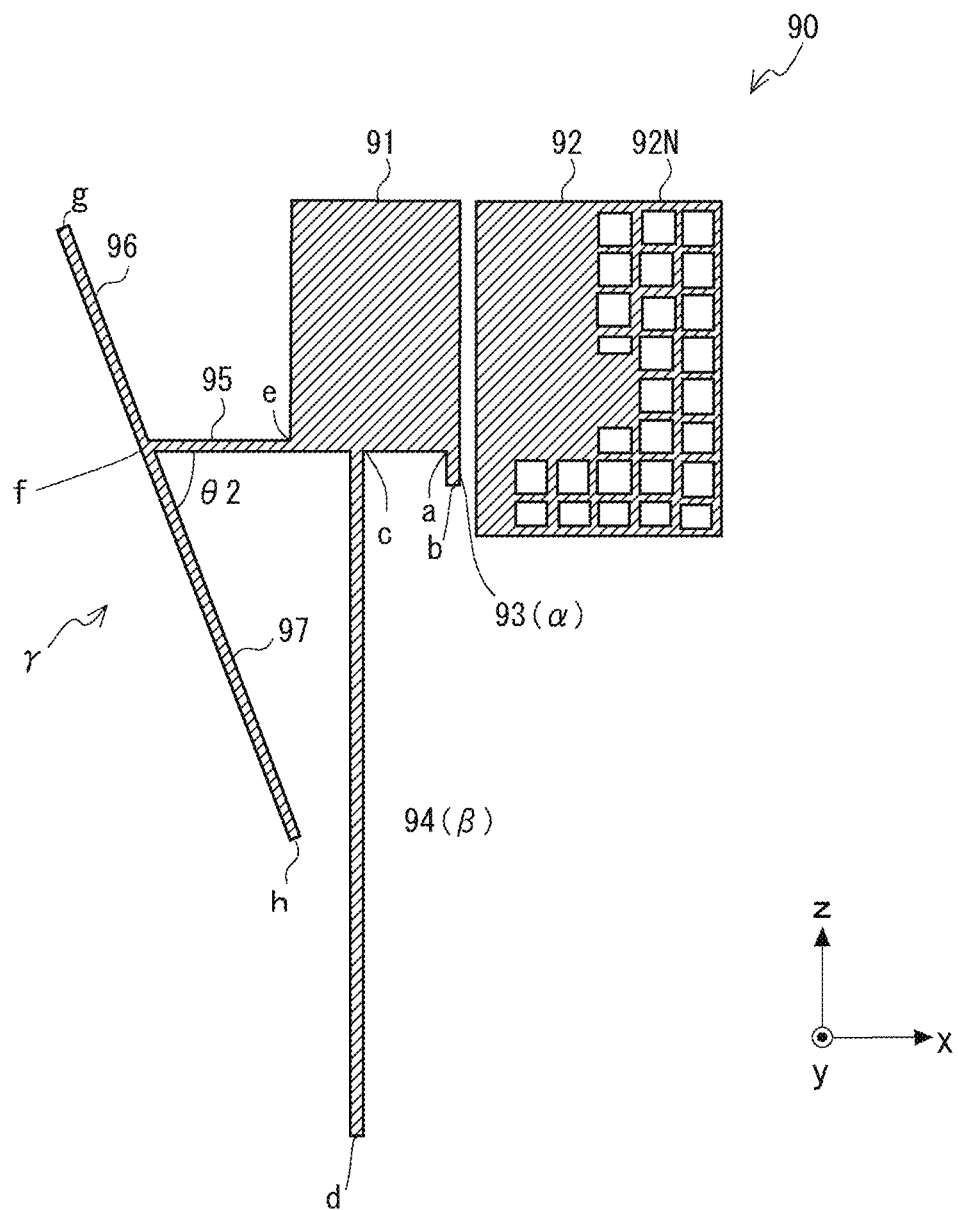
FIG. 7 is a diagram showing one example of an antenna according to a modified example 2.

With reference to FIG. 7, a configuration example of an antenna 90 in a vehicle antenna system 100 according to a modified example 2 will be described. FIG. 7 is an enlarged plan view showing one example of an antenna in the vehicle antenna system 100 according to the modified example 2. The antenna 90 is an antenna that is incorporated into the glass plate 30 by printing, embedding, pasting or the like. The antenna 90 is formed so as to include an electrode and an antenna conductor provided in the glass plate 30 as a planar conductor pattern.

The antenna 90 includes a feeding electrode 91, a ground-side electrode 92, and antenna elements 93-97. The feeding electrode 91 is a feeding point (positive-electrode-side feeding part) to which an inner conductor of a coaxial cable connected to the antenna 90 is electrically connected. The feeding electrode 91 may be an electrode having, for example, a rectangular shape, and a length in the longitudinal direction of 30 mm and a length in the short direction of 20 mm. Note that the shape of the feeding electrode 91 is not limited to a rectangular shape and may be a round shape or a polygonal shape other than the rectangular shape. Further, the length of the feeding electrode 91 in the longitudinal direction and that in the short direction are not limited to those stated above and may instead be lengths adjusted as appropriate.

The feeding electrode 91 is connected to the ground-side electrode 92 by a resistor module element (not shown) and a connector (not shown). The antenna 90 forms a closed circuit by the feeding electrode 91, the ground-side electrode 92, a resistor module element (not shown), and a connector (not shown).

The ground-side electrode 92, which is a negative-side feeding part, is attached apart from the feeding electrode 91. The ground-side electrode 92 may be an electrode having, for example, a rectangular shape, and a length in the longitudinal direction of 40 mm and a length in the short direction of 30 mm. The shape of the ground-side electrode 92 is not limited to the rectangular shape and may be a round shape or a polygonal shape other than the rectangular shape. Further, the length of the ground-side electrode 92 in the longitudinal direction and the length thereof in the short direction are not limited to the aforementioned ones and may be lengths adjusted as appropriate as appropriate.

The ground-side electrode 92 has a cutout part 92N formed therein. The cutout part 92N is formed in a part where a resistor module (not shown) and a connector (not shown) are not arranged. The antenna 90 has a wide shape as the widths of the feeding electrode 91 and the ground-side electrode 92 are large, whereby the antenna 90 is configured to be able to transmit and receive radio waves in wide frequency bands.

Note that if the areas of the feeding electrode 91 and the ground-side electrode 92 are made too large, the strength of the glass plate 30 to which the antenna 90 is attached becomes insufficient or strain may occur due to differences between thermal absorption or stress in the glass and that in the metal. Therefore, the ground-side electrode 92 is formed in such a manner that the cutout part 92N is formed therein and the cutout part 92N allows the width of the electrode to be increased while maintaining the strength of the glass plate 30.

The antenna element 93 is connected to the feeding electrode 91 at a connection point a, and is extended from the connection point a up to an end point b in the Z-axis negative direction. The antenna element 93 may have, for example, a length of 4 mm. The antenna element 93 forms an antenna conductor α. The antenna element 94 is connected to the feeding electrode 91 at a connection point c and is extended from the connection point c up to an end point d in the Z-axis negative direction. The distance from the connection point c to the end point d is larger than the distance from the connection point a to the end point b and may be, for example, 82 mm. The antenna element 94 forms an antenna conductor β. As shown in FIG. 7, the antenna elements 93 and 94 are extended in the vertical direction with respect to the XY-plane, which is a horizontal plane. Therefore, the antenna 90 is configured to be able to easily receive vertically polarized radio waves transmitted and received by the antenna 90.

The antenna element 95 is connected to the feeding electrode 91 at a connection point e and is extended from the connection point e up to a connection point f in the X-axis negative direction. The length of the antenna element 95 may be, for example, 96.8 mm. The antenna element 96 is connected to the antenna elements 95 and 97 at the connection point f. The antenna element 96 is extended from the connection point f to an end point g in the direction opposite to the direction in which the antenna element 97 is extended with respect to the connection point f. When the angle between the antenna element 95 and the antenna element 97 is an angle θ2, the antenna element 96 is extended in the Z-axis positive direction and the X-axis negative direction in such a way that the angle between the antenna element 95 and the antenna element 96 becomes equal to the angle obtained by subtracting the angle θ2 from 180°. The length of the antenna element 96 may be, for example, 28.1 mm. The antenna element 97 is connected to the antenna elements 95 and 96 at the connection point f and is extended from the connection point f up to an end point h in the Z-axis negative direction and the X-axis positive direction at an angle θ2 relative to the antenna element 95. The angle θ2 may be, for example, 69°. The length of the antenna element 97 may be, for example, 49.8 mm. The antenna elements 95-97 form an antenna conductor γ.

The antenna 90 includes the pair of electrodes (the feeding electrode 91 and the ground-side electrode 92) and the plurality of antenna elements 93-97, whereby communication can be performed in a plurality of frequency bands in a frequency band from 700 MHz to 6 GHz.

As described above, even when the configuration of the vehicle antenna system 100 is modified in such a way that the antenna 40 according to the first embodiment is replaced by the antenna 90 according to the modified example 2, the effects similar to those obtained in the first embodiment may be obtained. That is, the antenna 90 is attached at an elevation angle in accordance with the communication frequency band, whereby the optimal antenna gain may be obtained. Accordingly, the vehicle antenna system 100 according to the modified example 2 is able to form the vehicle antenna system having high transmission and reception efficiency in accordance with the corresponding frequency band, like in the first embodiment.

Second Embodiment

Next, a second embodiment will be described. In the first embodiment, the vehicle antenna system 100 includes one antenna 40. In the second embodiment, a vehicle antenna system 200 includes two antennas. While the vehicle antenna system 200 includes two antennas in this embodiment, the vehicle antenna system 200 may instead include three or more antennas.

<Configuration Example of Vehicle Antenna System>

Figure 8:
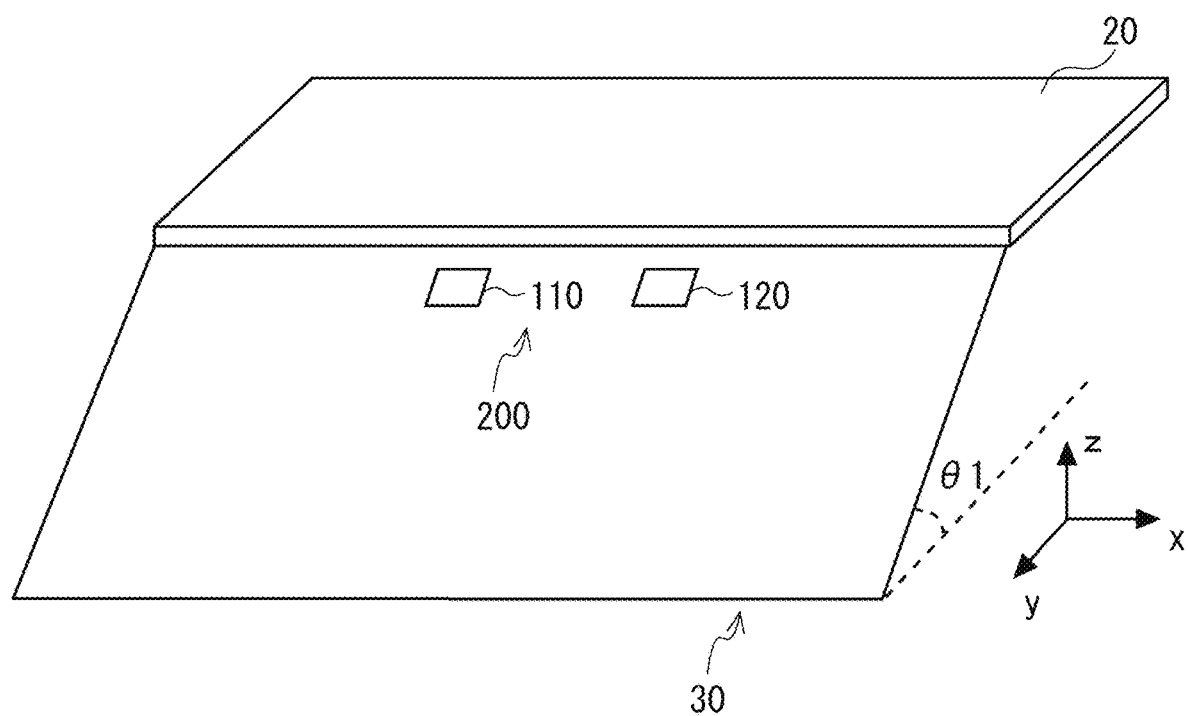
FIG. 8 is a perspective view illustrating a vehicle to which a vehicle antenna system according to a second embodiment is attached.

With reference to FIG. 8, a configuration example of the vehicle antenna system 200 according to the second embodiment will be described. FIG. 8 is a perspective view illustrating a vehicle to which the vehicle antenna system according to the second embodiment is attached.

The vehicle antenna system 200 is an antenna system attached to a vehicle 20. The vehicle antenna system 200 includes an antenna 110 and an antenna 120. The antenna 110 is attached to a part (a first part) of the vehicle 20 in such a way that a radiation surface is opposed to a glass plate 30 attached to the vehicle 20. The antenna 120 is attached to a part (a second part) of the vehicle in such a way that a radiation surface is opposed to the glass plate 30 attached to the vehicle 20. The first part and the second part may be provided in an upper central part of the glass plate 30. The first part may be provided on the left side of the windshield with respect to the upper central part thereof and the second part may be provided on the right side of the windshield with respect to the upper central part thereof. While the glass plate 30 is a windshield of the vehicle 20 in this embodiment as well, the glass plate 30 may instead be a rear glass or a side glass. Further, the first part and the second part may not be the parts of the windshield and may instead be any parts described in the modified example 1 of the first embodiment. Further, the first part and the second part may each be provided in a lower central part of the windshield or may be provided in a place near one of the right and left ends of the windshield.

The antennas 110 and 120 may be antenna modules in which the antenna conductor forms a three-dimensional shape, as shown in FIG. 2, or may be printed antennas provided in the glass surface, as shown in FIG. 7. The antennas 110 and 120 may be the same antenna or may be antennas different from each other. In other words, the antennas 110 and 120 may be antennas having the same shape or antennas having shapes different from each other. As a combination of a plurality of antennas of different shapes, the frequency bands in which the respective antennas can transmit and receive radio waves may have the same specification or may have different specifications.

The antennas 110 and 120 are antennas capable of transmitting and receiving radio waves of a predetermined frequency band. The predetermined frequency band is a frequency band supported by the antennas 110 and 120. The predetermined frequency band may be a frequency band from the 4G LTE frequency band to the 5G frequency band, or may be a frequency band from 700 MHz to a band smaller than 6 GHz (a so-called "5G-sub6"). The frequency at which the gain becomes a maximum in the antenna 110 and that in the antenna 120 are determined when they are designed and the antennas 110 and 120 are antennas whose frequencies at which the gain become a maximum are known. The frequency at which the gain becomes a maximum in the antenna 110 and that in the antenna 120 are respectively designed in such a way that they are included within a communication frequency band used for the communication using the antennas 110 and 120. In this embodiment, it is assumed that the frequency of the antenna 110 at which the antenna gain becomes a maximum is a frequency f5, the frequency of the antenna 120 at which the antenna gain becomes a maximum is a frequency f6, and the frequency f6 is higher than the frequency f5.

<Attachment Example of Antenna>

Figure 9:
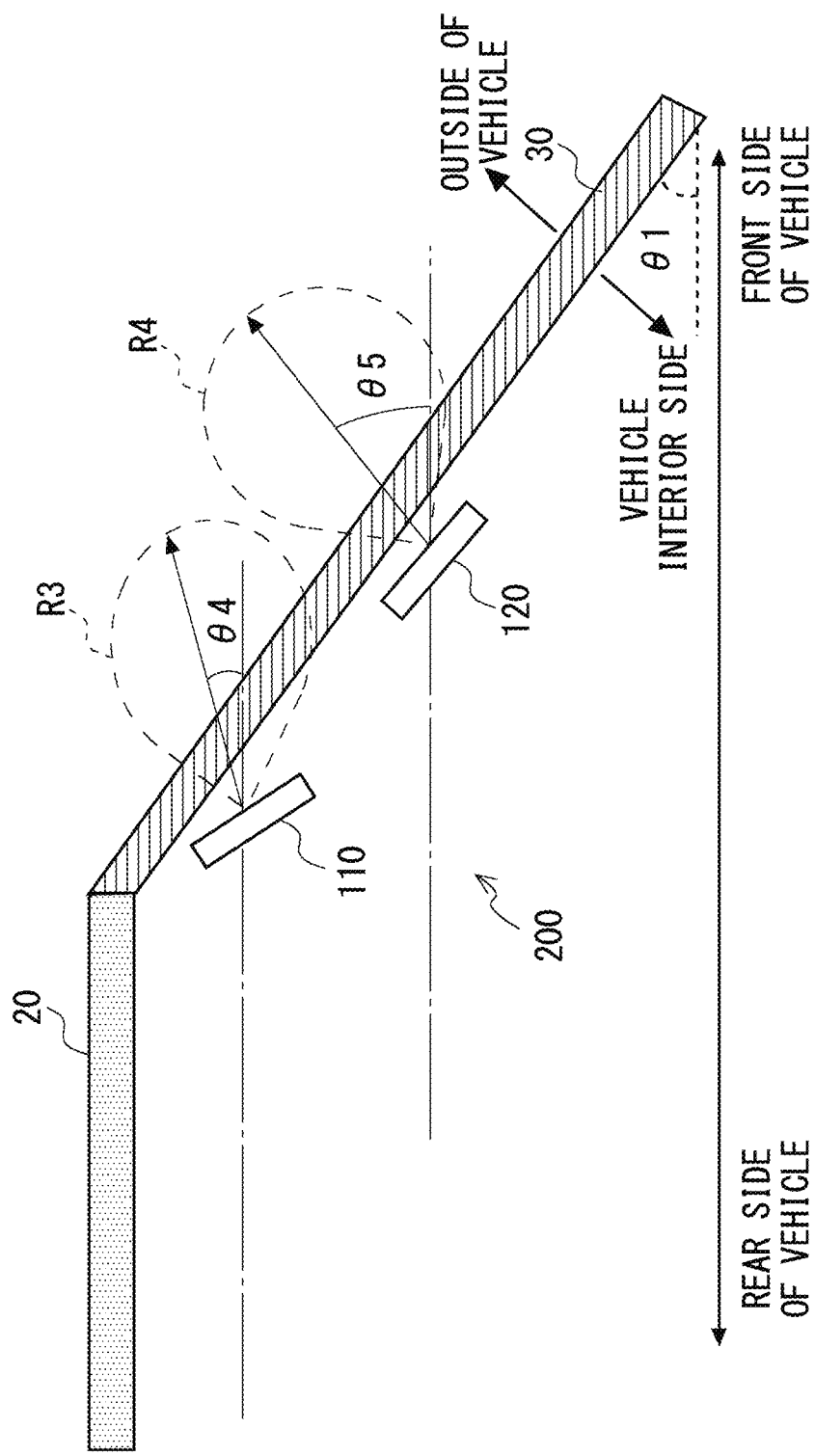
FIG. 9 is a diagram for describing an example in which an antenna according to the second embodiment is attached to a vehicle.

Referring next to FIG. 9, an example in which the antennas 110 and 120 are attached to the vehicle 20 will be described. FIG. 9 is an explanatory diagram of an example in which the antennas according to the second embodiment are attached to a vehicle, and is a partially enlarged view in a side view of the vehicle that corresponds to FIG. 4. While the antennas 110 and 120 are shown so as to be attached at the same height in FIG. 8, a description will be given assuming that the height at which the antenna 110 is attached and the height at which the antenna 120 is attached are different from each other for the sake of convenience of the description in FIG. 9.

At least one of the antennas 110 and 120 may be attached so as to be facing to the interior side of the glass plate 30 of the vehicle 20. The following description will be given assuming that the antennas 110 and 120 are attached so as to be facing to the interior side surface of the glass plate 30 of the vehicle 20.

The antennas 110 and 120 are attached in such a way that the elevation angles thereof are angles within a predetermined angle range with respect to the horizontal plane. In FIG. 9, the arrows pointing from the antennas 110 and 120 to the outside of the vehicle indicate the direction in which radio waves are transmitted from the antennas 110 and 120. The direction opposite to that of the above arrows indicates the direction in which radio waves are received by the antennas 110 and 120. A region R3 shown by the dotted line in FIG. 9 is a region schematically showing the radiation state of the radio waves in the antenna 110 and a region R4 is a region schematically showing the radiation state of the radio waves in the antenna 120. The arrows shown in FIG. 9 correspond to the center direction of the respective main lobes. An alternate long and short dash line shown so as to penetrate the antenna 110 indicates a plane parallel to the horizontal plane. An angle θ4 between the alternate long and short dash line and the arrow pointing from the antenna 110 to the outside of the vehicle corresponds to the elevation angle of the antenna 110. Likewise, an angle θ5 between an alternate long and short dash line shown so as to penetrate the antenna 120 and the arrow pointing from the antenna 120 to the outside of the vehicle corresponds to the elevation angle of the antenna 120.

Hereinafter, attachment examples of the antennas 110 and 120 will be described. In this embodiment, two attachment examples based on the communication frequency bands of the antennas 110 and 120 will be described.

<Attachment Example 1 of Antenna>

An attachment example 1 is an attachment example in a case in which a communication frequency band of the antenna 110 does not overlap a communication frequency band of the antenna 120. The antenna 110 is attached in such a way that the elevation angle thereof with respect to the horizontal plane becomes equal to the angle θ4 in a predetermined angle range. Further, when the communication frequency band of the antenna 120 is higher than the communication frequency band of the antenna 110, the antenna 120 is attached in such a way that the elevation angle thereof with respect to the horizontal plane becomes equal to the angle θ5, which is larger than the angle θ4, within a predetermined angle range. As shown in FIG. 3, the higher the frequency is, the larger the elevation angle of the antenna with respect to the horizontal plane is, whereby the antenna gain can be enhanced. Accordingly, when the communication frequency band of the antenna 120 is higher than the communication frequency band of the antenna 110 and these communication frequency bands do not overlap each other, the antennas 110 and 120 are attached to the vehicle 20 in such a way that the elevation angle of the antenna 120 becomes larger than the elevation angle of the antenna 110 based on the communication frequency bands. In this way, when the communication frequency bands do not overlap each other, the elevation angles of the antennas 110 and 120 are adjusted to be the angles in accordance with the communication frequency bands, whereby it is possible to obtain the vehicle antenna system 200 having high transmission and reception efficiency.

<Attachment Example 2 of Antenna>

The attachment example 2 is an attachment example in a case in which the communication frequency band of the antenna 110 overlaps the communication frequency band of the antenna 120. The attachment example 2 is an attachment example in a case in which at least a part of the communication frequency band of the antenna 110 and the communication frequency band of the antenna 120 overlap each other.

In this case, the elevation angles of the antennas 110 and 120 are determined in accordance with the frequencies at which the antenna gain becomes a maximum. Specifically, the angle θ4, which is the elevation angle of the antenna 110, is determined based on the frequency f5, which is a frequency at which the gain of the antenna 110 becomes a maximum. Further, the angle θ5, which is the elevation angle of the antenna 120, is determined based on the frequency f6, which is a frequency at which the gain of the antenna 120 becomes a maximum. As shown in FIG. 3, the higher the frequency is, the larger the elevation angle of the antenna with respect to the horizontal plane is, whereby the antenna gain can be enhanced. Therefore, in the attachment example 2, the elevation angles of the antennas 110 and 120 are adjusted to be the angles determined based on the frequencies at which the gain becomes a maximum, and then the antennas 110 and 120 are attached to the vehicle 20. In this way, when the communication frequency bands overlap each other, the elevation angles of the antennas 110 and 120 are adjusted to be the angles in accordance with the frequencies at which the gain becomes a maximum, whereby the vehicle antenna system 200 having high transmission and reception efficiency may be obtained.

<Attachment Example 3 of Antenna>

An attachment example 3 is an example in which the antennas 110 and 120 attached to the vehicle antenna system 200 are attached to the vehicle 20 in azimuth angles different from each other. For example, the antennas 110 and 120 are attached to the vehicle 20 in such a way that one of these antennas is provided on the inner surface side of the windshield and the other one of the antennas is provided on the inner surface side of the rear glass in a distributed manner, whereby the vehicle antenna system 200 is able to transmit and receive radio waves of a predetermined frequency band over the azimuth angles from 0° to 360° around the vehicle 20, as shown in FIG. 6. That is, in this example, the first part and the second part correspond to a combination of the inner surface side of the windshield and the inner surface side of the rear glass. Further, the antennas 110 and 120 attached to the vehicle antenna system 200 may be attached on the inner surface sides of the two side glasses in a distributed manner.

As described above, when the antennas 110 and 120 are attached to the vehicle 20 in azimuth angles different from each other, the antennas 110 and 120 may be attached to the vehicle 20 in such a way that the difference between these azimuth angles becomes 150° to 180°, whereby the vehicle antenna system 200 is able to transmit and receive radio waves of a predetermined frequency band over the azimuth angles from 0° to 360° about the vehicle 20. In particular, the radiation direction of the antennas 110 and 120 is often substantially equal to the direction normal to the radiation surface of each of the antennas. In the vehicle antenna system 200, the difference between the azimuth angles, which corresponds to the difference between the angle of the radiation direction of the antenna 110 and the angle of the radiation direction of the antenna 120 when the vehicle 20 is seen from the vertical direction (Z-axis direction), is preferably 160° to 180°, more preferably 170° to 180°, and further preferably 175° to 180°. In this manner, the parts where the antennas 110 and 120 are attached may be, for example, the parts where the antennas are attached in FIG. 6.

Further, the number of antennas attached to the vehicle antenna system 200 may be four. In this case, these four antennas may be attached in such a way that one of them is attached to the inner surface side of the windshield, another one of them is attached to the inner surface side of the rear glass, and the remaining antennas may be attached to the inner surface sides of the two side glasses. In this case, the elevation angles of the respective antennas attached to the respective parts of the vehicle are adjusted to be the angles in accordance with frequencies at which the gain becomes a maximum, whereby the vehicle antenna system 200 having high transmission and reception efficiency may be obtained.

As described above, the antennas 110 and 120 included in the vehicle antenna system 200 are attached in such a way that the elevation angles thereof are those in accordance with the communication frequency band or the frequencies at which the gain of the antennas 110 and 120 becomes a maximum, whereby the optimal antenna gain may be obtained. Accordingly, with the vehicle antenna system 200 according to the second embodiment, it is possible to provide the vehicle antenna system having high transmission and reception efficiency.

While the present invention has been described in view of the aforementioned embodiments, the present invention is not limited to the configurations of the aforementioned embodiments, and it is needless to say that the present invention includes various changes, modifications, and combinations that may be made by one skilled in the art within the claims of the present application.

What is claimed is:

1. A vehicle antenna system comprising:
a first antenna that is attached to a vehicle and is capable of transmitting and receiving radio waves of a predetermined frequency band,
wherein:
the first antenna is attached to the vehicle in such a way that as a frequency of the first antenna becomes higher within a frequency range from 700 MHz to 6 GHz, a correlation between a receiving/transmitting power of the first antenna and a value of an elevation angle of the first antenna with respect to a horizontal plane becomes higher for the value of the elevation angle being from 0 degrees to 45 degrees;
the first antenna is attached to a first part of the vehicle;
the vehicle antenna system further comprises a second antenna attached to a second part of the vehicle;
the first antenna is attached to the vehicle at a first elevation angle within the predetermined angle range with respect to the horizontal plane;
a communication frequency band of the second antenna is higher than a communication frequency band of the first antenna; and
the second antenna is attached to the vehicle at a second elevation angle within the predetermined angle range with respect to the horizontal plane, the second elevation angle being larger than the first elevation angle.

2. The vehicle antenna system according to Claim 1, wherein
the communication frequency band of the first antenna and the communication frequency band of the second antenna partially overlap each other,
the first elevation angle is determined based on a frequency of the first antenna at which a gain becomes a maximum, and
the second elevation angle is determined based on a frequency of the second antenna at which a gain becomes a maximum.

3. The vehicle antenna system according to Claim 1, wherein the first antenna and the second antenna are antennas having the same shape.

4. The vehicle antenna system according to Claim 1, wherein an antenna conductor of at least one of the first antenna and the second antenna has a three- dimensional shape.

5. The vehicle antenna system according to Claim 1, wherein at least one of the first antenna and the second antenna is attached that a radiation surface is opposed to a glass inside the vehicle.

6. The vehicle antenna system according to claim 5, wherein at least one of the first antenna and the second antenna is attached that the radiation surface is substantially parallel to a plane of the glass.

7. The vehicle antenna system according to claim 5, wherein the glass includes at least one of a windshield, a rear glass, and a side glass.

8. The vehicle antenna system according to Claim 1, wherein the difference between an angle of a radiation direction of the first antenna and an angle of a radiation direction of the second antenna seen from a vertical direction of the vehicle is 150° to 180°.

9. The vehicle antenna system according to claim 8, wherein the first part and the second part are a combination of an inner surface side of a windshield and an inner surface side of a rear glass.

\* \* \* \* \*